US012261357B2

(12) United States Patent
Eom

(10) Patent No.: US 12,261,357 B2
(45) Date of Patent: Mar. 25, 2025

(54) ANTENNA APPARATUS FOR SUPPRESSING MULTIPATH SIGNALS

(71) Applicant: ELECTRONICS AND TELECOMMUNICATIONS RESEARCH INSTITUTE, Daejeon (KR)

(72) Inventor: Soon Young Eom, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 115 days.

(21) Appl. No.: 18/079,960

(22) Filed: Dec. 13, 2022

(65) Prior Publication Data

US 2023/0208019 A1 Jun. 29, 2023

(30) Foreign Application Priority Data

Dec. 28, 2021 (KR) ........................ 10-2021-0190174

(51) Int. Cl.

| | |
|---|---|
| ***H01Q 1/42*** | (2006.01) |
| ***H01Q 1/48*** | (2006.01) |
| ***H01Q 1/52*** | (2006.01) |
| ***H01Q 21/24*** | (2006.01) |

(52) U.S. Cl.

CPC ................. *H01Q 1/42* (2013.01); *H01Q 1/48* (2013.01); *H01Q 1/52* (2013.01); *H01Q 21/24* (2013.01)

(58) Field of Classification Search

CPC ........ H01Q 1/42; H01Q 1/32; H01Q 1/38–48; H01Q 1/52; H01Q 21/24

See application file for complete search history.

(56) References Cited

U.S. PATENT DOCUMENTS

| | | | | |
|---|---|---|---|---|
| 4,359,738 A | | 11/1982 | Lewis | |
| 5,995,044 A | | 11/1999 | Kunysz et al. | |
| 6,069,590 A | * | 5/2000 | Thompson, Jr ........ | H01Q 21/26 343/797 |
| 6,278,407 B1 | | 8/2001 | Ashjaee et al. | |
| 6,683,570 B2 | * | 1/2004 | Skladany ............. | H01Q 9/0414 343/872 |
| 9,673,519 B2 | | 6/2017 | Tatarnikov et al. | |

(Continued)

FOREIGN PATENT DOCUMENTS

| | | |
|---|---|---|
| CN | 1299468 A | 6/2001 |
| CN | 103457027 A | 12/2013 |

(Continued)

OTHER PUBLICATIONS

Novatel, "Antenna Module for OEM Integrators", Antennas Pinwheel OEM.

(Continued)

*Primary Examiner* — Hasan Islam

(74) *Attorney, Agent, or Firm* — LRK PATENT LAW FIRM

(57) ABSTRACT

An antenna radome apparatus is provided, the apparatus including: an antenna generating circular polarization; a radome protecting the antenna from an external environment; and a metal mask pattern having a predetermined shape on an inner wall or an outer wall of the radome, wherein the metal mask pattern suppresses a multipath signal flowing into the antenna.

13 Claims, 14 Drawing Sheets

(56) References Cited

U.S. PATENT DOCUMENTS

| | | | | |
|---|---|---|---|---|
| 11,456,525 | B2 * | 9/2022 | Katsura | H01Q 1/3208 |
| 2005/0099336 | A1 * | 5/2005 | Apostolos | H01Q 9/30 343/872 |
| 2010/0277374 | A1 | 11/2010 | Ju et al. | |
| 2015/0015451 | A1 | 1/2015 | Tatarnikov et al. | |
| 2015/0207233 | A1 | 7/2015 | Kim et al. | |
| 2017/0047665 | A1 | 2/2017 | Yang et al. | |
| 2017/0358855 | A1 | 12/2017 | Tasker et al. | |
| 2020/0203820 | A1 | 6/2020 | Lee et al. | |

FOREIGN PATENT DOCUMENTS

| | | | |
|---|---|---|---|
| EP | 3591760 | A1 | 6/2019 |
| JP | 2017028429 | A | 2/2017 |
| KR | 10-1548915 | B1 | 9/2015 |
| KR | 10-2020-0060975 | A | 6/2020 |
| KR | 10-2020-0078993 | A | 7/2020 |
| WO | 2015/027551 | A1 | 3/2015 |

OTHER PUBLICATIONS

Soon Young Eom et al., "Radome Design of GPS Antenna for Multipath Signal Suppression", 2022 IPNT Conference, Nov. 2-4, 2022, Gangneung, Korea.

Dmitry Tatarnikov, "Topcon Full Wave GNSS Reference Station Antenna with Convex Impedance Ground Plane", PN-A5, rev.4.

Francesca Scire-Scappuzzo et al., "A Low-Multipath Wideband GPS Antenna With Cutoff or Non-Cutoff Corrugated Ground Plan", IEEE Transactions On Antennas and Propagation, vol. 57, No. 1, Jan. 2009.

* cited by examiner

ANTENNA APPARATUS FOR SUPPRESSING MULTIPATH SIGNALS

CROSS REFERENCE TO RELATED APPLICATION(S)

The present application is based on and claims the benefit of priority to Korean Patent Application Number 10-2021-0190174, filed on Dec. 28, 2021 in the Korean Intellectual Property Office, the entire disclosure of which is incorporated herein by reference.

BACKGROUND

1. Field of the Invention

The present disclosure relates to an antenna apparatus capable of suppressing multipath signals.

2. Description of Related Art

Most small wireless communication antennas are operated in a complex propagation environment with multiple paths. For example, an antenna used in a global navigation satellite system (GNSS) has multiple paths due to scattering from buildings or nearby interfering objects in a downtown area, and polarization characteristics of the antenna may change accordingly. Most electronic and communications products used in modern society are equipped with the GNSS and used to provide time and location information. However, when multipath signals are incident on a GNSS receiver, the performance of the GNSS receiver may deteriorate.

SUMMARY

An embodiment provides an antenna apparatus including a radome on which a mask pattern is formed.

Another embodiment provides an antenna radome apparatus including a radome on which a mask pattern is formed.

According to an embodiment, an antenna apparatus is provided. The antenna apparatus includes a radome on which a mask pattern is formed; an antenna module accommodated inside the radome; and a ground structure providing ground to the antenna module, wherein the mask pattern is formed to have a predetermined width on a surface of the radome, and one side of the mask pattern is connected to the ground structure to suppress a multipath signal incident on the antenna apparatus.

In the antenna apparatus, when the radome is cylindrical, the mask pattern may be formed to surround a side surface of an inner wall of the radome.

In the antenna apparatus, when the radome is cylindrical, the mask pattern may be formed to surround a side surface of an outer wall of the radome.

In the antenna apparatus, when the surface of the radome is curved, the mask pattern may be formed to have a predetermined height from the ground structure.

In the antenna apparatus, the mask pattern may include a plurality of concavo-convex portions, and a shape of the concavo-convex portion may be predetermined according to an incident angle of the multipath signal.

In the antenna apparatus, the shape of the concavo-convex portion may be triangular or quadrangular.

In the antenna apparatus, the mask pattern may be an electrical conductor.

In the antenna apparatus, the multipath signal suppressed by the mask pattern may include a reflected wave signal or a cross polarized signal.

According to another embodiment, an antenna radome apparatus includes an antenna generating circular polarization; a radome protecting the antenna from an external environment; and a metal mask pattern having a predetermined shape on an inner wall or an outer wall of the radome, wherein the metal mask pattern suppresses a multipath signal flowing into the antenna.

In the antenna radome apparatus, an outer shape of the radome is a cylindrical prism or a rectangular prism.

In the antenna radome apparatus, the predetermined shape may include at least one of a cylindrical patternless, a concavo-convex shape, or a sawtooth shape.

In the antenna radome apparatus, the metal mask pattern may be deposited on the inner wall or the outer wall of the radome using a conductive paint.

In the antenna radome apparatus, the metal mask pattern may be formed on a thin flexible printed circuit board (FPCB) or a dielectric film, and the FPCB or the dielectric film on which the metal mask pattern is formed is attached to the inner wall or the outer wall of the radome.

In the antenna radome apparatus, the metal mask pattern may be deposited on or inserted into both the inner wall and the outer wall of the radome.

By integrally forming a thin mask pattern on an antenna radome, an effect of suppressing multipath signals may be achieved without increasing manufacturing cost and without increasing a size and weight of the antenna.

DETAILED DESCRIPTION

Figure 1:
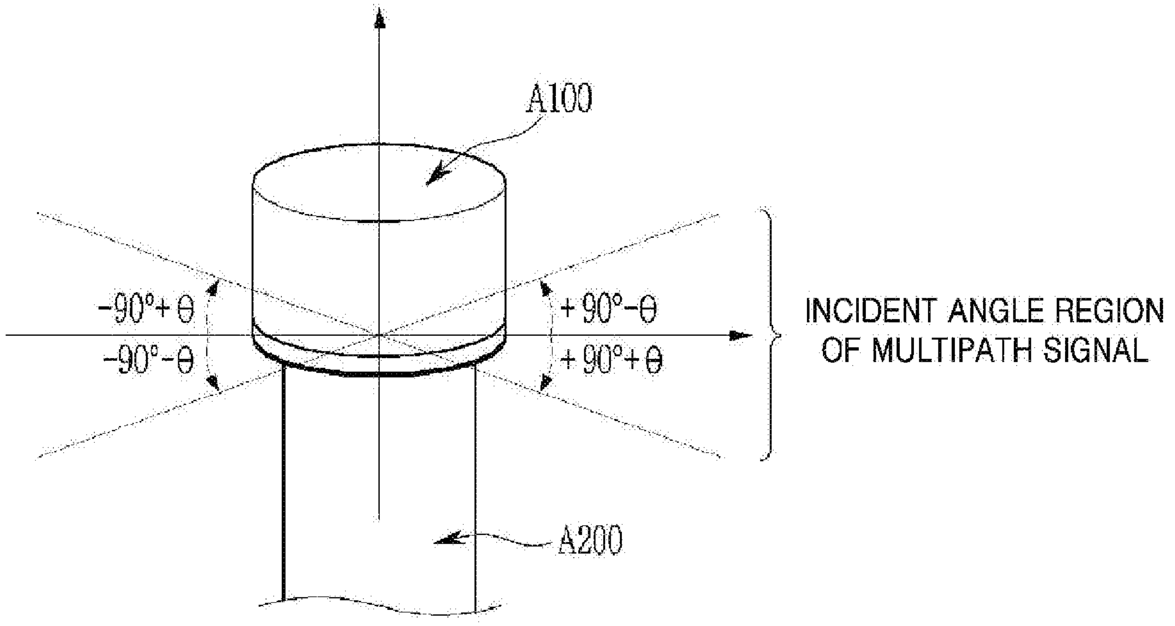
FIG. 1 is a conceptual diagram illustrating an incident angle region of a signal incident on an antenna according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, when a part is referred to "include" a certain element, it means that it may further include other elements rather than exclude other elements, unless specifically indicates otherwise.

In the description, expressions described in the singular in this specification may be interpreted as the singular or plural unless an explicit expression, such as "one" or "single" is used.

In this specification, "and/or" includes each and every combination of one or more of the mentioned elements.

Terms, such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present disclosure.

FIG. 1 is a conceptual diagram illustrating an incident angle region of a signal incident on an antenna according to an embodiment.

Referring to FIG. 1, a multipath signal may generally be incident in a range of 90°±θ(±θ is generally ±30° or less) on a horizontal plane of an antenna (e.g., a wireless communication/broadcasting or GNSS antenna having circular polarization) A100 on an upper portion of an antenna installation pillar A200. The multipath signal may be transformed into a cross-polarized signal by ambient reflection or scattering. Since axial ratio performance of the antenna may be defined by the ratio of a main polarization component and the cross polarization component, the axial ratio performance of the antenna may need to be improved to suppress the cross polarization component in the range of 90°±θ from a vertical plane.

Figure 2A:
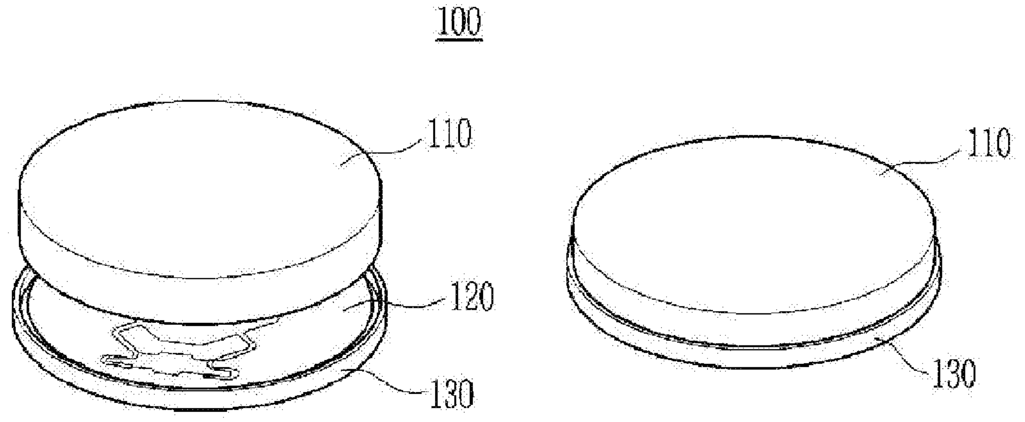
FIG. 2A is a conceptual diagram illustrating a planar antenna according to an embodiment.
Figure 2B:
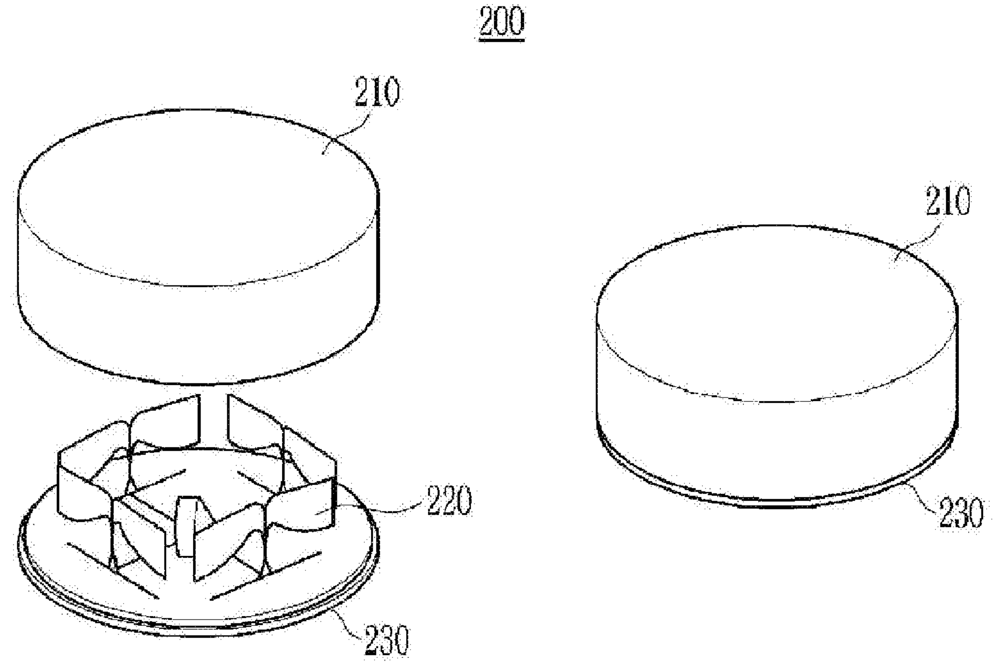
FIG. 2B is a conceptual diagram illustrating a three-dimensional (3D) antenna according to an embodiment.

FIG. 2A is a conceptual diagram illustrating a planar antenna according to an embodiment, and FIG. 2B is a conceptual diagram illustrating a 3D antenna according to an embodiment.

A planar antenna 100 according to an embodiment may include a patch antenna 120 inside a radome 110 and generate circular polarization. Referring to FIG. 2A, the planar antenna 100 according to an embodiment may include the radome 110, an antenna module 120, and a ground structure 130. The antenna module 120 may be a stacked microstrip patch antenna and may be located on the ground structure 130. The ground structure 130 may provide a ground to the antenna module 120 and an upper portion of the antenna module 120 and the ground structure 130 may be covered by the radome 110. The planar antenna 100 shown in FIG. 2A has a relatively small antenna gain but may be manufactured to have a low height.

Referring to FIG. 2B, a three-dimensional (3D) antenna 200 according to an embodiment may include a radome 210, an antenna module 220, and a ground structure 230.

The antenna module 220 may be located on the ground structure 230 and may include a plurality of radiating elements having linear polarization and a power supply network providing 90° sequential phase delay power supply. An upper portion of the antenna module 220 and the ground structure 230 may be covered by the radome 210. That is, the antenna module 220 may be accommodated inside the radome 210. The 3D antenna 200 shown in FIG. 2B may have a relatively large antenna gain but an antenna height thereof may be relatively high.

Figure 3A:
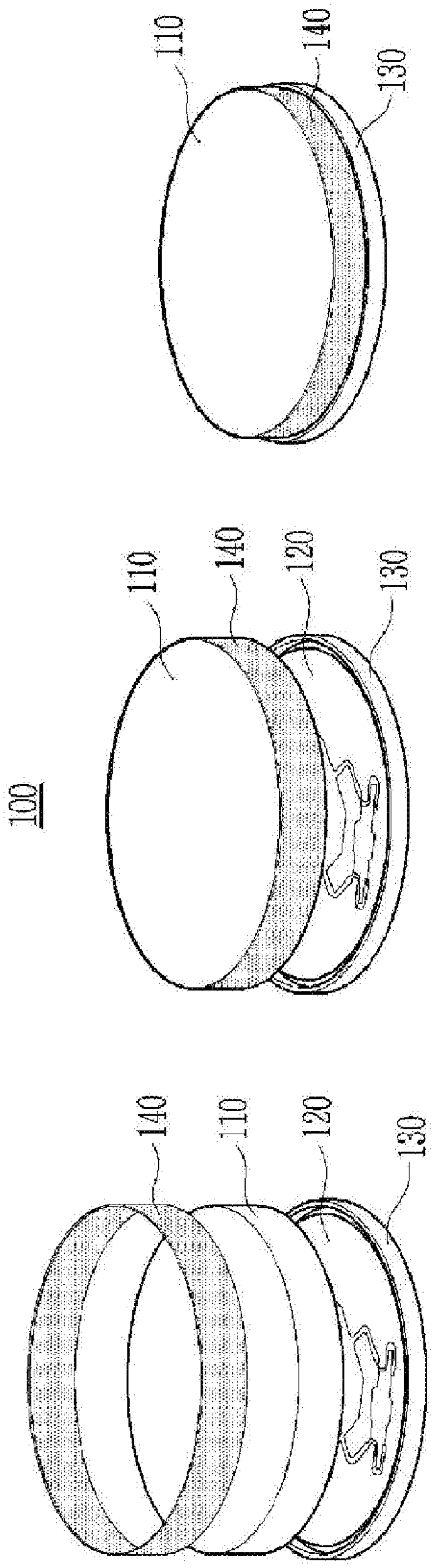
FIG. 3A is a conceptual diagram illustrating a planar antenna having a radome on which a mask pattern is formed according to an embodiment.
Figure 3B:
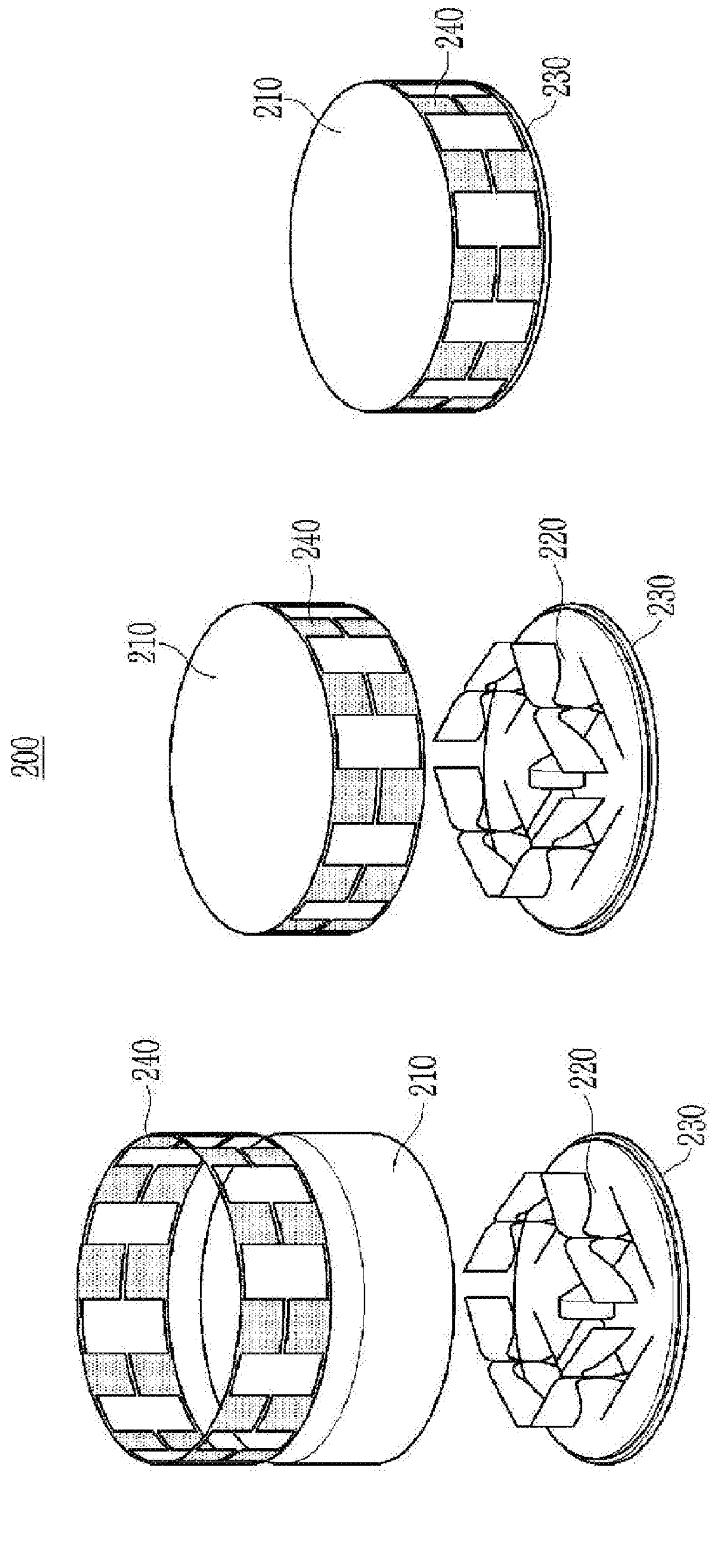
FIG. 3B is a conceptual diagram illustrating a 3D antenna having a radome on which a mask pattern is formed according to another embodiment.

FIG. 3A is a conceptual diagram illustrating a planar antenna having a radome on which a mask pattern is formed according to an embodiment, and FIG. 3B is a conceptual diagram illustrating a 3D antenna having a radome on which a mask pattern is formed according to another embodiment.

Referring to FIGS. 3A and 3B, mask patterns 140 and 240 are formed on radomes 110 and 210 of antennas having various circular polarizations. Since a multipath signal (reflected wave signal or cross polarized signal, etc.) incident on the antennas 100 and 200 is suppressed by the mask patterns 140 and 240 of the radomes 110 and 210, the multipath signal cannot affect the antenna modules 120 and 220 inside the radomes 110 and 210.

Referring to FIG. 3A, a mask pattern (MP) 140 in the form of a band (or belt, etc.) having a predetermined width is formed on an outer surface of the radome 110 of the planar antenna 100. The mask pattern 140 may be, for example, an electrical conductor such as metal. The mask pattern 140 may be deposited on or inserted into a surface (e.g., an inner wall or an outer wall) of the radome 110.

The mask pattern 140 may have a shape surrounding the outer surface of the radome 110. When the radome 110 is in the form of a cylinder or pillar with a polygonal top surface, the mask pattern 140 may be formed to surround a side surface of the radome 110.

Referring to FIG. 3B, the band-shaped mask pattern 240 including a plurality of concavo-convex portions is formed on the outer surface of the radome 210 of the 3D antenna 200. The band of the mask pattern 240 may include a plurality of bands separated vertically. For example, at least one of the concavo-convex shapes of the mask pattern 240 including two bands may be connected to each other. That is, the plurality of bands of the mask pattern 240 may be separated from each other or partially connected to each other.

Referring to FIG. 3B, the shape of the concavo-convex portion of the mask pattern 240 may be previously determined according to an incident angle of a multipath signal. That is, a width of the concavo-convex portion of the mask pattern 240, a depth of the concavo-convex portion, and an interval between the concavo-convex portions may be predetermined according to the incident angle of the multipath signal. A primarily reflected multipath signal may have a cross polarization characteristic, and the mask pattern 240 according to an embodiment may have a 3D geometric structure for suppressing the cross polarization characteristic of a circular polarization signal. A circumferential length of the mask pattern 240 according to an embodiment is related to an operating frequency. The mask pattern 240 may have a polygonal shape, such as a triangle or a quadrangle, according to an incident environment of a multipath signal.

According to an embodiment, the mask patterns 140 and 240 may be attached to the radomes 110 and 210 in various manners. In a radome integrated structure, the mask patterns 140 and 240 may be directly deposited on the radome 110 and 210 using a conductive paint. When the mask patterns 140 and 240 are directly deposited on the radomes 110 and 210, a conductive paint having excellent conductivity needs to be used. In the radome separated structure, the mask patterns 140 and 240 may be formed on a thin substrate (e.g., a flexible printed circuit board (FPCB), etc.) or a dielectric film and then separately attached to the radomes 110 and 210.

Figure 4A:
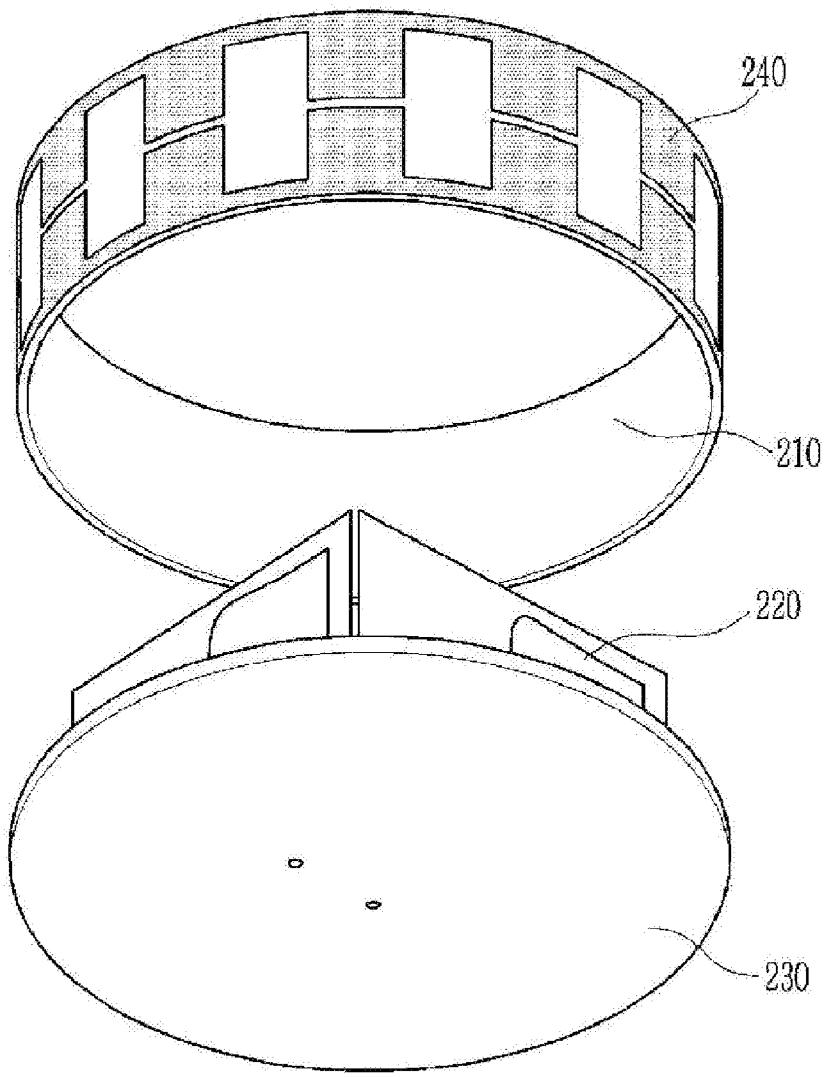
FIG. 4A is a conceptual diagram illustrating a mask pattern formed outside a radome according to an embodiment.
Figure 4B:
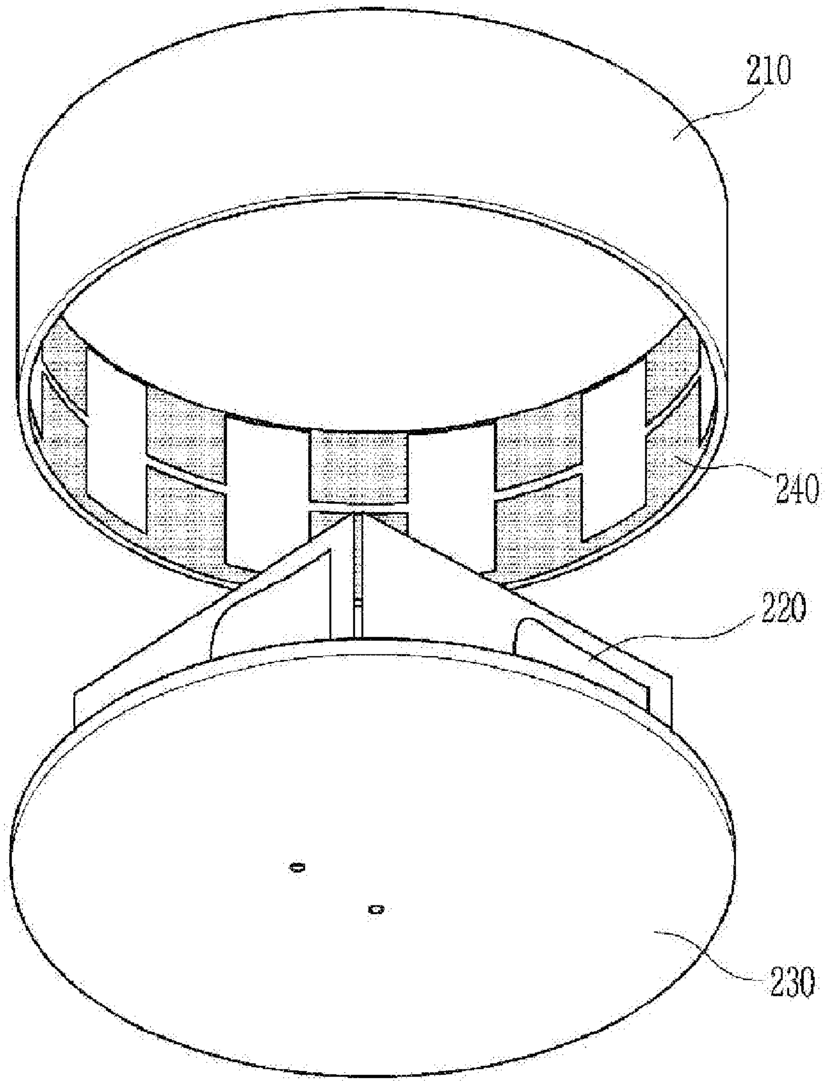
FIG. 4B is a conceptual diagram illustrating a mask pattern formed inside a radome according to another embodiment.

FIG. 4A is a conceptual diagram illustrating a mask pattern formed on the outside of a radome according to an embodiment, FIG. 4B is a conceptual diagram illustrating a mask pattern formed on the inside of a radome according to another embodiment.

Referring to FIG. 4A, the mask pattern 240 is formed on an outer side surface of the radome 210 accommodating the antenna module 220. Referring to FIG. 4B, the mask pattern 240 is formed on an inner side surface of the radome 210 accommodating the antenna module 220.

Although the mask pattern 240 of the 3D antenna 200 is shown in FIGS. 4A and 4B, the mask pattern 140 of the planar antenna 100 may also be formed outside or inside the radome 110. Alternatively, the mask patterns 140 and 240 may be formed both outside and inside the radomes 110 and 210.

Figure 5:
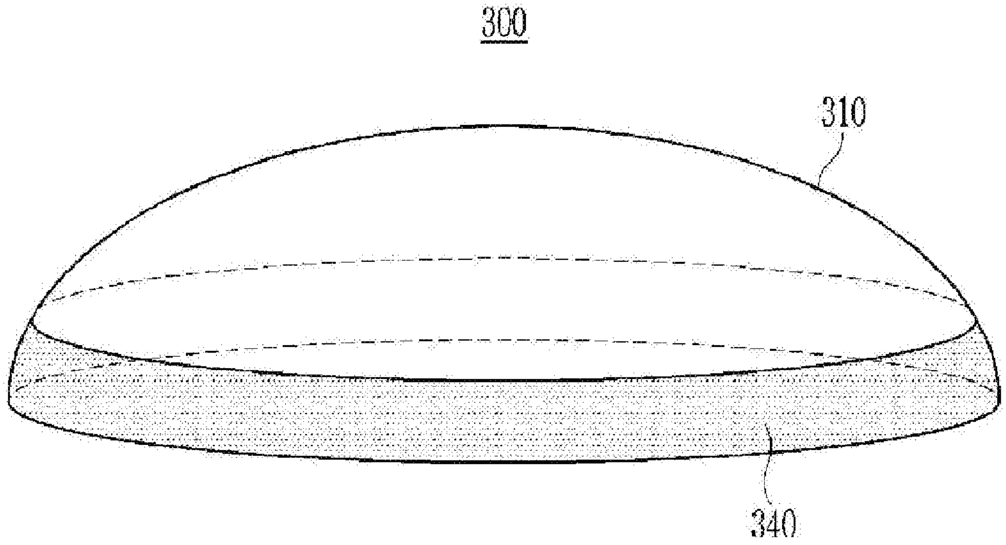
FIG. 5 is a conceptual diagram illustrating a hemispherical antenna having a radome on which a mask pattern is formed according to another embodiment.

FIG. 5 is a conceptual diagram illustrating a hemispherical antenna having a radome on which a mask pattern is formed according to another embodiment.

When the outside of the radome 310 is part of a spherical surface, a mask pattern 340 in the hemispherical antenna 300 may be formed in a portion near a lower surface of the radome 310. Referring to FIG. 5, the mask pattern 340 is formed to have a predetermined height from the lower surface (that is, one side in contact with the ground structure) of the radome 310. Here, a width of the mask pattern 340 may be predetermined according to the incident angle of the multipath signal to be blocked.

Figure 6:
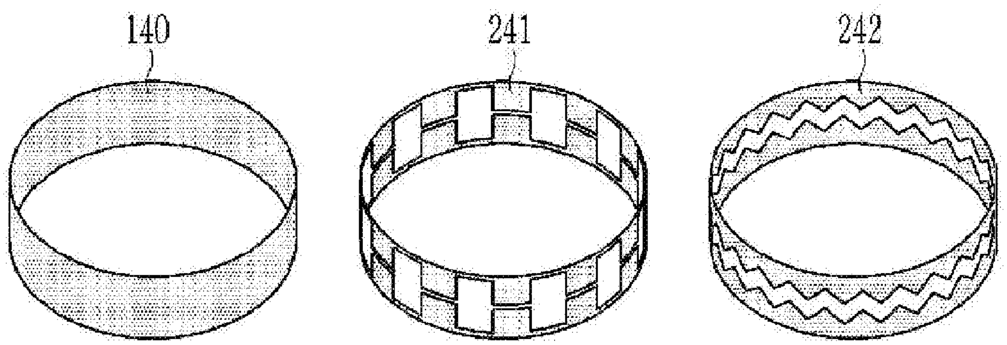
FIG. 6 is a conceptual diagram illustrating various mask patterns according to an embodiment.

FIG. 6 is a conceptual diagram illustrating various mask patterns according to an embodiment.

A mask pattern according to an embodiment may have any shape capable of suppressing or blocking multipath signals. Referring to FIG. 6, the mask pattern may be patternless 140, a concavo-convex shape 241, a sawtooth shape 235, and the like.

Figure 7A:
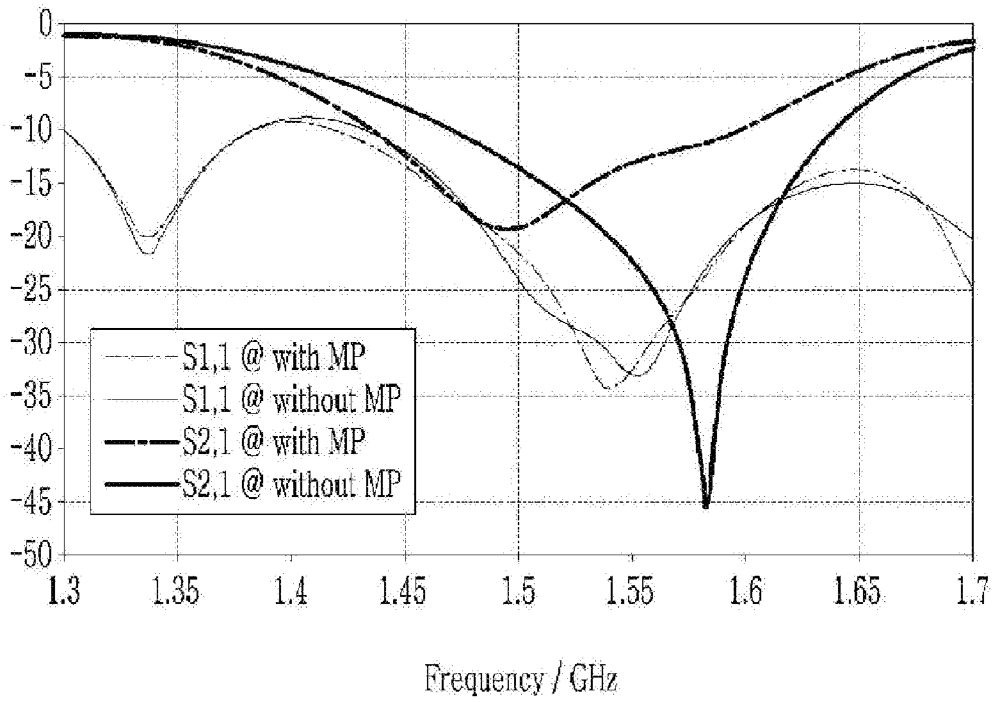
FIGS. 7A to 7C are graphs illustrating a change in electrical performance of a planar antenna shown in FIG. 3A.
Figure 7B:
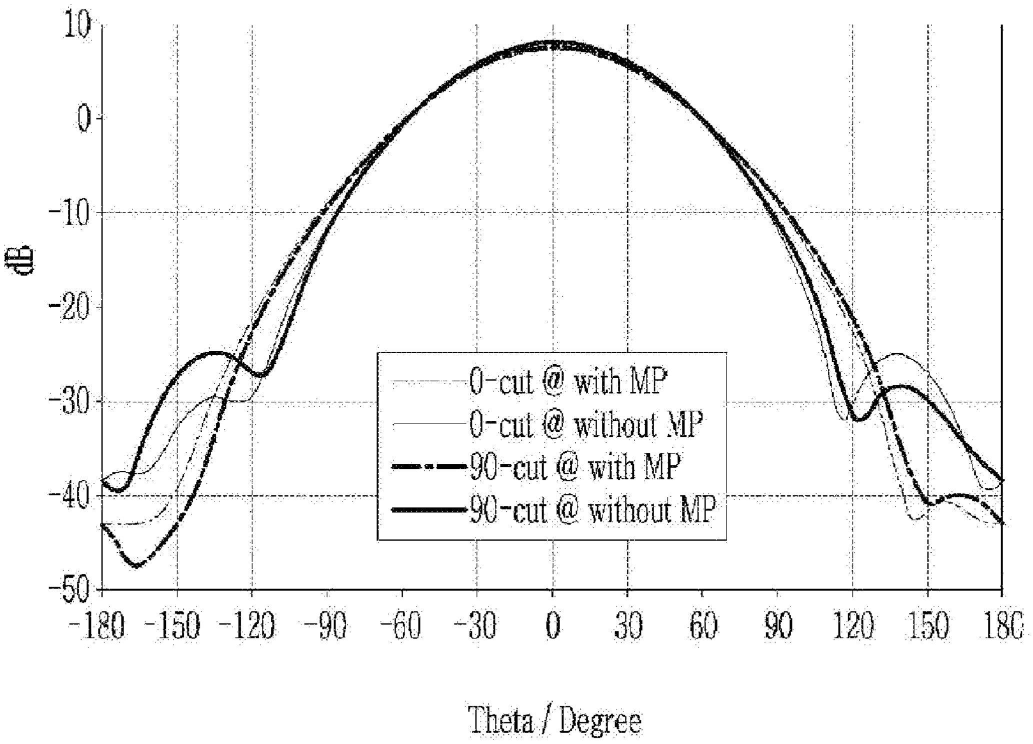
Figure 7C:
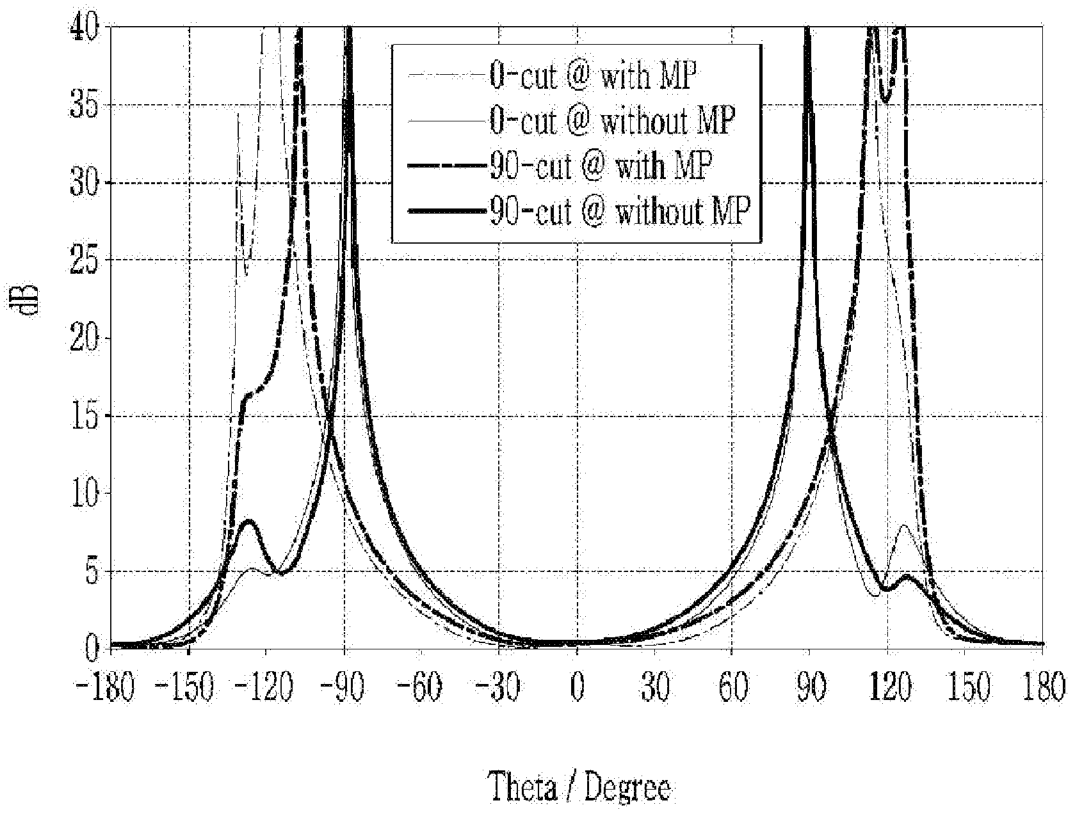

FIGS. 7A to 7C are graphs illustrating changes in electrical performance of the planar antenna shown in FIG. 3A.

A band-shaped mask pattern 140 is formed on the outer surface of the radome 110 of the planar antenna 100 shown in FIG. 3A, and referring to FIG. 7A, an input matching characteristic has moved to a lower frequency band by the mask pattern 140. This change in input matching characteristic may be corrected by adjusting a size of a radiating element included in the planar antenna 100.

Referring to FIG. 7B, it can be seen that, in the antenna radiation characteristic (f=1.5754 [GHz]), a 3 [dB] beam width increases by about 3.5° (70.2°→73.7°), and an antenna gain decreases by about 0.7 [dB]. Referring to FIG. 7C, as for an axial ratio characteristic (f=1.5754 [GHz]), it can be seen that a suppression angle range of a multipath signal in a 5.7 [dB] reference performance is expanded by about 13.70 (63.3°→77.0°). Meanwhile, as for axial ratio performance at 5.7 [dB], a level of cross polarization is less than a main polarization by about 10 [dB]. When the width of the mask pattern 140 deposited on the radome 110 of the planar antenna 100 is extended, the effect of suppressing the multipath signal may be further improved. When the height of the radome on which the mask pattern 140 is deposited is extended, the effect of suppressing the multipath signal may also be improved.

Figure 8A:
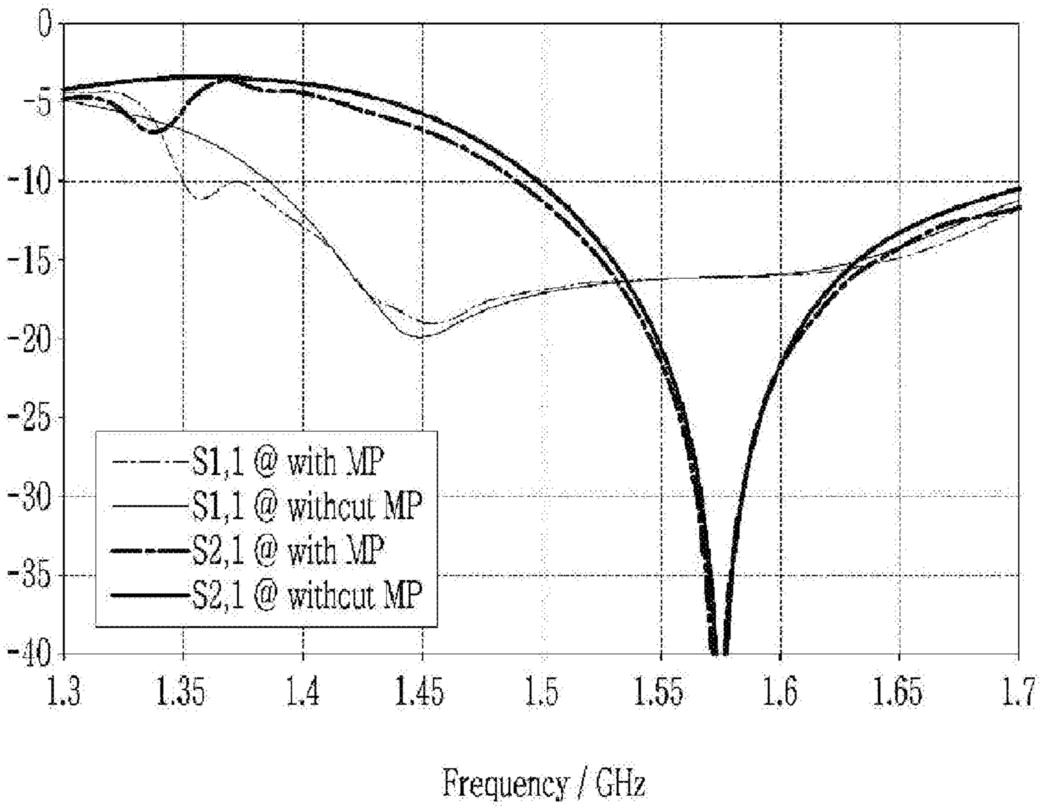
FIGS. 8A to 8C are graphs illustrating a change in electrical performance of the 3D antenna shown in FIG. 3B.
Figure 8B:
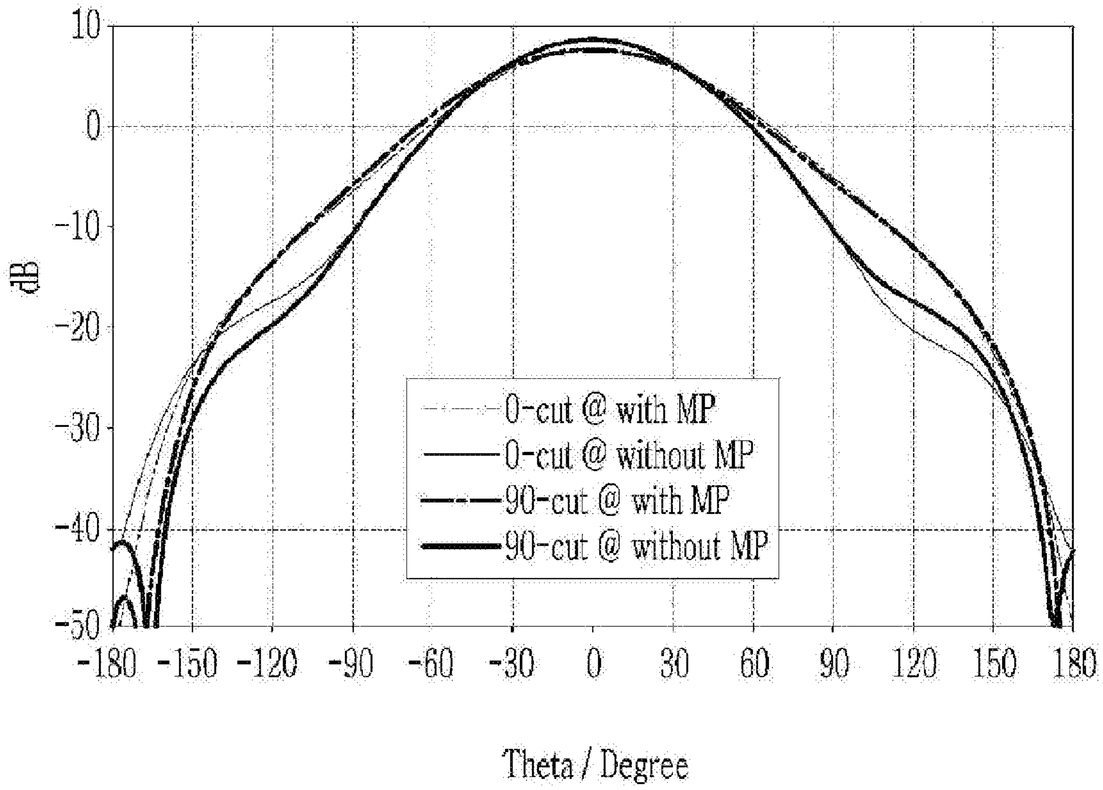
Figure 8C:
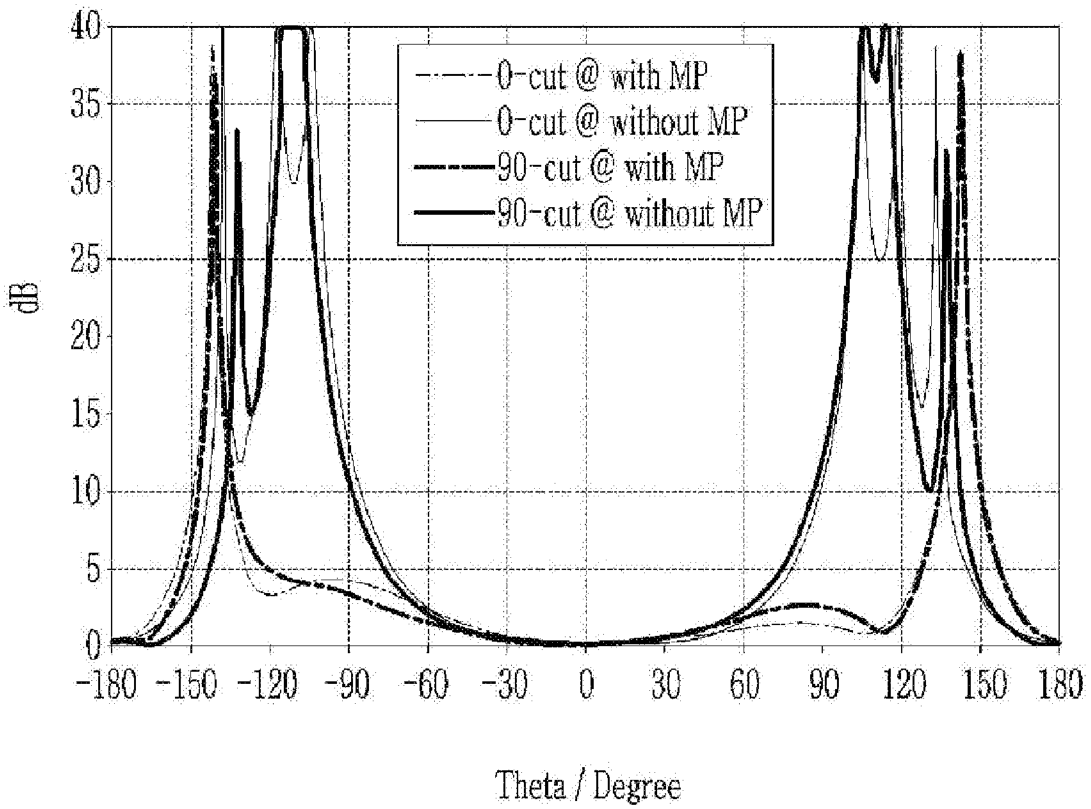

FIGS. 8A to 8C are graphs illustrating changes in electrical performance of the 3D antenna shown in FIG. 3B.

The band-shaped mask pattern 240 including concavo-convex portions is formed on the outer surface of the radome 210 of the 3D antenna 200 shown in FIG. 3B. Since the input matching characteristic of the antenna may generally move to a low frequency band due to the mask pattern 240, the input matching characteristic adjusted through correction of a radiating element included in the 3D antenna 200 is illustrated in FIG. 8A. Referring to FIG. 8A, it can be seen that the input matching characteristic of the 3D antenna 200 is similarly maintained through the correction of the radiating element despite the presence of the mask pattern.

Referring to FIG. 8B, it can be seen that, in an antenna radiation characteristic (f=1.5754 [GHz]), the 3 [dB] beam width increases by about 8.7° (68.8°→77.5°), and accordingly, the antenna gain characteristic decreases by about 0.88 [dB]. Referring to FIG. 8C, it can be seen that, when comparing the axial ratio characteristic (f=1.5754 [GHz]) with the reference performance of 5.7 [dB], a suppression range of the multipath signal is extended by about 50.2° (77.8°→128°). Meanwhile, as for axial ratio performance at 5.7 [dB], a level of cross polarization may be less than a main polarization by about 10 [dB].

As described above, by forming a thin mask pattern on the antenna radome and integrally producing the mask pattern on the radome, the effect of suppressing a multipath signal without increasing the size and weight of the antenna and without increasing manufacturing cost may be achieved.

While the invention has been described with reference to exemplary embodiments thereof, one of ordinary skill in the art would understand that various changes in form and details may be made therein without departing from the idea and scope of the invention as defined by the claims and equivalents thereof.

What is claimed is:

1. An antenna apparatus comprising:
- a radome on which a conductive mask pattern is formed;
- an antenna module accommodated inside the radome; and
- a ground structure providing ground to the antenna module,
- wherein the conductive mask pattern is formed to have a predetermined width on a side surface of the radome, and one side of the conductive mask pattern is connected to the ground structure to suppress a multipath signal incident on the antenna apparatus, and
- wherein the conductive mask pattern is formed to surround the side surface of the radome,
- wherein the conductive mask pattern includes a plurality of concavo-convex portions, and a shape of the concavo-convex portion is predetermined according to an incident angle of the multipath signal.

2. The antenna apparatus of claim 1, wherein, when the radome is cylindrical, the conductive mask pattern is formed to surround an inner wall of the radome.

3. The antenna apparatus of claim 1, wherein, when the radome is cylindrical, the conductive mask pattern is formed to surround an outer wall of the radome.

4. The antenna apparatus of claim 1, wherein, when the side surface of the radome is curved, the conductive mask pattern is formed to have a predetermined height from the ground structure.

5. The antenna apparatus of claim 1, wherein the shape of the concavo-convex portion is triangular or quadrangular.

6. The antenna apparatus of claim 1, wherein the conductive mask pattern is an electrical conductor.

7. The antenna apparatus of claim 1, wherein the multipath signal suppressed by the conductive mask pattern includes a reflected wave signal or a cross polarized signal.

8. The antenna apparatus of claim 1,
wherein the antenna apparatus is configured to generate circular polarization;
wherein the radome is configured to protect the antenna module from an external environment; and
wherein the conductive mask pattern is configured to have a predetermined shape on an inner wall or an outer wall of the radome.

9. The antenna apparatus of claim 8, wherein an outer shape of the radome is a cylindrical prism or a rectangular prism.

10. The antenna apparatus of claim 8, wherein the predetermined shape includes at least one of a cylindrical patternless, a concavo-convex shape, or a sawtooth shape.

11. The antenna apparatus of claim 8, wherein the conductive mask pattern is deposited on the inner wall or the outer wall of the radome using a conductive paint.

12. The antenna apparatus of claim 8, wherein the conductive mask pattern is formed on a thin flexible printed circuit board (FPCB) or a dielectric film, and the FPCB or the dielectric film on which the conductive mask pattern is formed is attached to the inner wall or the outer wall of the radome.

13. The antenna apparatus of claim 8, wherein the conductive mask pattern is deposited on or inserted into both the inner wall and the outer wall of the radome.

* * * * *